(12) United States Patent
Jung et al.

(10) Patent No.: US 12,158,965 B2
(45) Date of Patent: Dec. 3, 2024

(54) METHOD FOR SHARING PROFILE IN CONTAINER ENVIRONMENT, AND RECORDING MEDIUM AND APPARATUS FOR PERFORMING THE SAME

(71) Applicant: Foundation of Soongsil University-Industry Cooperation, Seoul (KR)

(72) Inventors: Soohwan Jung, Seoul (KR); Ngoc-Tu Chau, Seoul (KR); Thien-Phuc Doan, Seoul (KR); Songi Gwak, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 263 days.

(21) Appl. No.: 17/877,073

(22) Filed: Jul. 29, 2022

(65) Prior Publication Data

US 2023/0015726 A1    Jan. 19, 2023

Related U.S. Application Data

(63) Continuation-in-part of application No. PCT/KR2022/005015, filed on Apr. 7, 2022.

(30) Foreign Application Priority Data

Jul. 8, 2021    (KR) ........................ 10-2021-0089527

(51) Int. Cl.
*G06F 21/62*    (2013.01)
*G06F 21/53*    (2013.01)
*H04L 67/306*    (2022.01)

(52) U.S. Cl.
CPC .......... *G06F 21/6218* (2013.01); *G06F 21/53* (2013.01); *H04L 67/306* (2013.01)

(58) Field of Classification Search
CPC .... G06F 21/6218; G06F 21/53; G06F 21/604; H04L 67/306
See application file for complete search history.

(56) References Cited

U.S. PATENT DOCUMENTS

| 10,310,824 B2 | 6/2019 | Eksten et al. |
| 2008/0184299 A1 | 7/2008 | Park et al. |
| (Continued) | | |

FOREIGN PATENT DOCUMENTS

| JP | 6016984 B2 | 10/2016 |
| KR | 10-2020-0107538 A | 9/2020 |
| KR | 10-2020-0107538 A1 | 9/2020 |

OTHER PUBLICATIONS

Korean Office Action mailed Oct. 24, 2022, issued to Korean Application No. 102021-0089527.
(Continued)

*Primary Examiner* — Joe Chacko
(74) *Attorney, Agent, or Firm* — Stein IP, LLC

(57) ABSTRACT

Provided is a design method for sharing a profile in a container environment, including: extracting a sensitive context defined as information related to system-based access control or a sandboxing policy and an insensitive context defined as information unrelated to security for a profile provided by a developer; extracting the sensitive context and the insensitive context for the profile provided by a host; fetching a max configuration for the sensitive and insensitive contexts from each image layer of the developer; and generating a final profile that is applied to deploy the container by merging the host profile with the max configuration fetched from the developer profile. Accordingly, it is possible to provide an optimal environment to developers and hosts by generating the final profile with a hierarchical model using the host profile and the developer profile.

5 Claims, 5 Drawing Sheets

(56) References Cited

U.S. PATENT DOCUMENTS

| | | | |
|---|---|---|---|
| 2012/0246317 A1 | 9/2012 | Eriksson et al. | |
| 2013/0275990 A1* | 10/2013 | Koutyrine | G06F 8/51 |
| | | | 718/104 |
| 2018/0329693 A1 | 11/2018 | Eksten et al. | |
| 2019/0260716 A1* | 8/2019 | Lerner | H04L 63/0876 |
| 2020/0076811 A1 | 3/2020 | Rudden et al. | |
| 2020/0193015 A1* | 6/2020 | Levin | G06F 21/54 |
| 2020/0285733 A1* | 9/2020 | Kim | G06F 21/53 |
| 2021/0089361 A1* | 3/2021 | Rafey | G06F 9/45558 |
| 2024/0134328 A1* | 4/2024 | Nixon | G05B 15/02 |
| 2024/0134329 A1* | 4/2024 | Vinyard | G05B 15/02 |

OTHER PUBLICATIONS

Kubernetes, "Managing Resources for Containers" (Jun. 2021).
William Findlay et al., "BPFCONTAIN: Fixing the Soft Underbelly of Container Security" (Feb. 2021).

* cited by examiner

METHOD FOR SHARING PROFILE IN CONTAINER ENVIRONMENT, AND RECORDING MEDIUM AND APPARATUS FOR PERFORMING THE SAME

CROSS-REFERENCE TO RELATED APPLICATION(S)

The present application is a continuation-in-part of international patent application No. PCT/KR2022/005015 filed on Apr. 7, 2022, and claims priority to Korean patent application No. 10-2021-0089527 filed on Jul. 8, 2021, the entire contents of which are hereby incorporated by reference.

TECHNICAL FIELD

The present invention relates to a design method for sharing a profile in a container environment, and a recording medium and apparatus for performing the same, and more particularly, to a technology for generating a final profile for providing a safe and optimized environment to a developer and a host using a context of the developer and the host.

BACKGROUND ART

Image manifests and container scans are main sources of a research related to image-analysis. Until now, container administrators have used manifests to store image information such as layers, sizes, and digests. In addition, container manifest commands make it possible to know information of an operating system and a structure of an image.

The container scan is used to provide a detailed scan report of container images by providing files used in generating images.

Meanwhile, security contexts define permission and access control settings for pods or containers deployed by container hosts. The security contexts are widely used in container orchestration projects such as Kubernetes.

In the related art, the security contexts and container settings are defined and analyzed in host. However, the development groups merely provide images including its applications. In addition, in the existing design, the host needs to perform a black box analysis of the developer's environment to provide safe and optimized profiles.

DETAILED DESCRIPTION

Technical Problem

The present invention is directed to providing a design method for sharing a profile optimized by both a developer and a host in a container environment.

The present invention is also directed to providing a recording medium on which a computer program for executing the design method for sharing the profile optimized by both the developer and the host in the container environment is recorded.

The present invention is also directed to providing an apparatus for executing the design method for sharing the profile optimized by both the developer and the host in the container environment.

Technical Solution

One aspect of the present invention provides a design method for sharing a profile in a container environment, including: extracting a sensitive context defined as information related to system-based access control or a sandboxing policy and an insensitive context defined as information not related to security for a profile provided by a developer; extracting the sensitive context and the insensitive context for the profile provided by a host; fetching a max configuration for the sensitive and insensitive contexts from each image layer of the developer; and generating a final profile that is applied to deploy the container by merging the host profile with the max configuration fetched from the developer profile.

In the generating of the final profile, the sensitive context may be applied to a host policy, and the insensitive context may be extended according to a developer's request.

The sensitive context of the final profile may be the smallest profile of the sensitive context of the host and the sensitive context of the developer.

The insensitive context of the final profile may be the insensitive context of the developer.

Another aspect of the present invention provides a computer-readable storage medium on which the design method for sharing a profile in a container environment described above is recorded.

Still another aspect of the present invention provides a design apparatus for sharing a profile in a container environment, including: a developer context extractor configured to extract a sensitive context defined as information related to system-based access control or a sandboxing policy and an insensitive context defined as information not related to security for a profile provided by a developer; a host context extractor configured to extract the sensitive context and the insensitive context for the profile provided by a host; a max configuration extractor configured to fetch a max configuration for the sensitive and insensitive contexts from each image layer of the developer; and a final profile generator configured to generate a final profile that is applied to deploy the container by merging the host profile with the max configuration fetched from the developer profile.

The final profile generator may apply the sensitive context to a host policy, and extend the insensitive context according to a developer's request.

The sensitive context of the final profile may be the smallest profile of the sensitive context of the host and the sensitive context of the developer.

The insensitive context of the final profile may be the insensitive context of the developer.

Advantageous Effects

According to a design method for sharing a profile in a container environment, it is possible to provide an optimized environment to a developer and a host by generating a final profile according to a hierarchical model using a host profile (deployment profile) and a developer profile. In addition, it is possible to perform a more accurate analysis using white box analysis from the developer's side compared to the existing black box analysis method.

Furthermore, it is possible for the host to apply its own security and isolation policy to the developer profile to ensure that the container is constrained by security context since the host continues to hold its own profile.

MODES OF THE INVENTION

Figure 1:
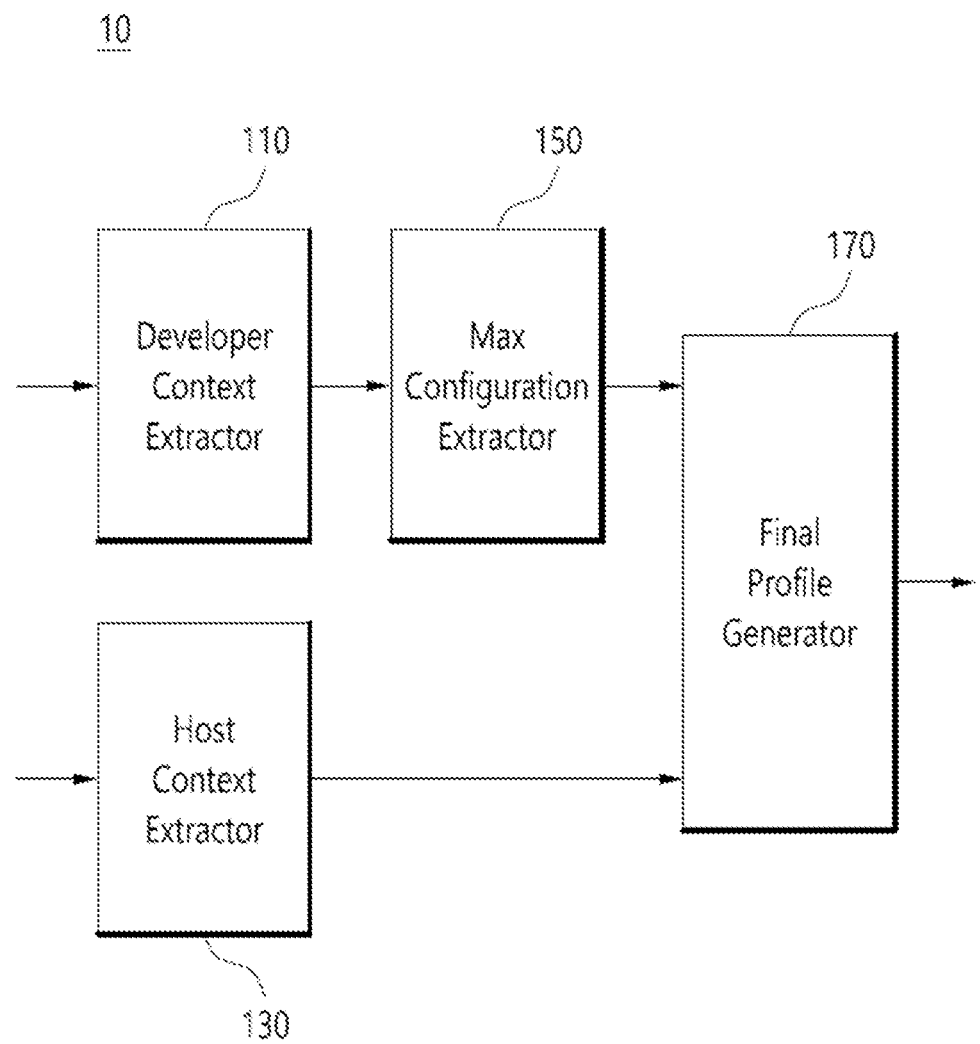
FIG. 1 is a block diagram of a design apparatus for sharing a profile in a container environment according to an embodiment of the present invention.

Embodiments of the present invention will be described in detail with reference to the accompanying figures. These embodiments will be described in detail to enable those skilled in the art to practice the present invention. It should be understood that various exemplary embodiments of the present invention are different from each other, but do not have to be mutually exclusive. For example, specific shapes, structures, and characteristics described in the present specification may be implemented in another exemplary embodiment without departing from the objective and the scope of the present invention in connection with an exemplary embodiment. In addition, it should be understood that a position or an arrangement of individual components in each exemplary embodiment may be changed without departing from the objective and the scope of the present invention. Therefore, the detailed description described below should not be construed as being restrictive, and the scope of the present invention is defined only by the accompanying claims and their equivalents if appropriate. Similar reference numerals will be used to describe the same or similar functions throughout the accompanying figures.

Hereinafter, exemplary embodiments of the present invention will be described in more detail with reference to the accompanying figures.

FIG. 1 is a block diagram of a design apparatus for sharing a profile in a container environment according to an embodiment of the present invention.

A design apparatus 10 (hereinafter, apparatus) for sharing a profile in a container environment according to the present invention generates a final profile to provide a safe and optimized environment to a developer and a host using a context of the developer and the host, and applies the generated final profile to the container.

Referring to FIG. 1, the apparatus 10 according to the present invention includes a developer context extractor 110, a host context extractor 130, a max configuration extractor 150, and a final profile generator 170.

The apparatus 10 of the present invention may be executed by installing a software (application) for executing the design for sharing a profile in a container environment. The configurations of the developer context extractor 110, the host context extractor 130, the max configuration extractor 150, and the final profile generator 170 may be controlled by the software for performing the design for sharing the profile in the container environment running on the apparatus 10.

The apparatus 10 may be a separate terminal or a part of a module of the terminal. In addition, the configurations of the developer context extractor 110, the host context extractor 130, the max configuration extractor 150, and the final profile generator 170 may be formed as an integrated module, or may be formed as one or more modules. However, on the other hand, each configuration may be configured as a separate module.

The apparatus 10 may be movable or stationary. The apparatus 10 may be in the form of a server or an engine, and may be called by terms such as "device," "application," "terminal," "user equipment (UE)," "mobile station (MS)," "wireless device," "handheld device," and etc.

The apparatus 10 may execute or produce various types of software based on an operating system (OS), that is, a system. The OS is a system program that allows the software to use the hardware of the apparatus, and it may include both a mobile computer OS (such as Android OS, iOS, Windows Mobile OS, Bada OS, Symbian OS, or Blackberry OS) and a computer OS (such as Windows series, Linux series, Unix series, MAC, AIX, or HP-UX).

The developer context extractor 110 extracts a sensitive context and an insensitive context from the profile provided by the developer.

The developer (development) profile represents recommended insensitive security and resource contexts. The development profile is provided by a container image provider.

For example, the sensitive context may be defined as information related to system-based access control or a sandboxing policy, and the insensitive context may be defined as information that is unrelated to the security.

For example, there are capabilities that may be described in a profile such as CAP_SYS_TRACE. When the corresponding container image provides a tracking capability, requesting the SYS_TRACE capability is a very normal operation, so it should be determined that the SYS_TRACE capability is not sensitive for this type of image. However, it is rare for an application program such as a web server to request this type of capability.

As another example, there is a seccomp profile. Docker provides a list of system calls that do not harm the container (are normal and permitted), but not all system calls are directly related to the application program.

Accordingly, the sensitive context may be the system-based access control (capability model, seccomp, Mandatory Access Control (MAC) rules) or sandboxing policy (namespace, a device-based cgroup policy, and etc.). Conversely, the insensitive context may be information that is unrelated to security, such as a Central Processing Unit (CPU) or a memory.

However, criteria for distinguishing between the sensitive context and the insensitive context may be defined differently depending on a system policy, user's needs, and etc., and may be modified and updated.

Figure 2:
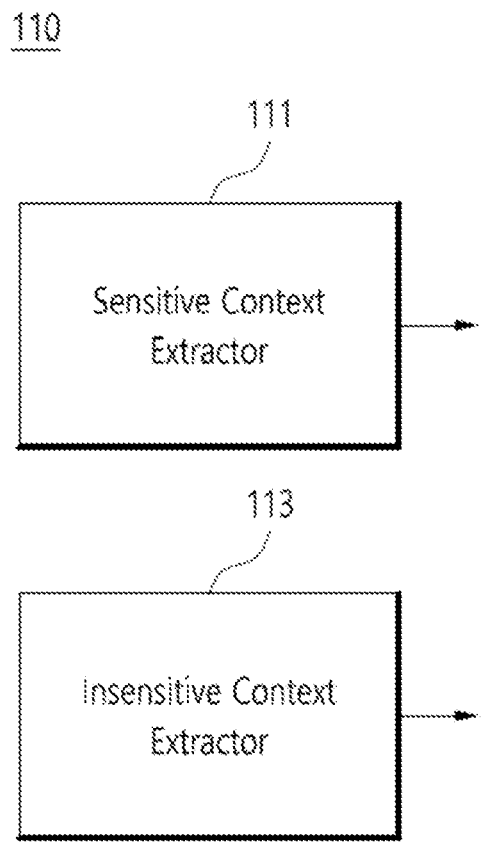
FIG. 2 is a block diagram of a developer context extractor of FIG. 1.

Referring to FIG. 2, the developer context extractor 110 may include a sensitive context extractor 111 that extracts the sensitive context for the developer's profile and an insensitive context extractor 113 that extracts the insensitive context for the developer's profile.

Hereinafter, the insensitive context of the developer is defined as $SC_d = \{SC_1, SC_2, \ldots\}$, and the insensitive context of the developer is defined as $NSC_d = \{NSC_1, NSC_2, \ldots\}$.

The host context extractor 130 extracts the sensitive context and the insensitive context for the profile provided by the host.

The host (deployment) profile represents the security and the resource contexts that the host may assign to a particular container.

Similarly, for the profile provided by the host, the host context extractor 130 may include the sensitive context extractor that extracts the sensitive context and the insensitive context extractor that extracts the insensitive context.

In addition, criteria for distinguishing between the sensitive context and the insensitive context may be defined differently depending on a system policy, user needs, and etc., and may be modified and updated.

Hereinafter, the insensitive context of the host is defined as $SC_h=\{SC_1, SC_2, \ldots\}$, and the insensitive context of the host is defined as $NSC_h=\{NSC_1, NSC_2, \ldots\}$.

The max configuration extractor 150 fetches the max configuration for the sensitive context and the insensitive context from each image layer of the developer.

Figure 3:
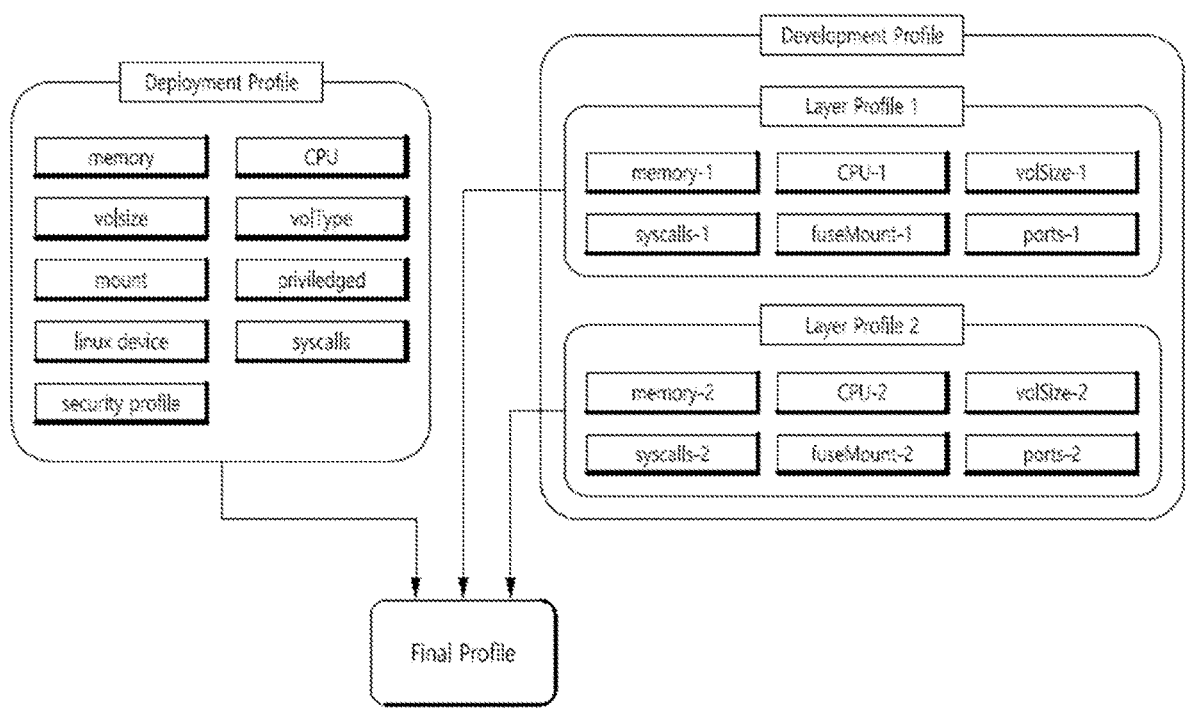
FIG. 3 is a conceptual diagram illustrating a profile sharing model for a container environment according to the present invention.

FIG. 3 illustrates the structures of the development profile and the deployment profile. The container is formed of a collection of various image layers. In the profile sharing model, each layer has its own security and resource profile.

$SC_i=\max(SC_i[0], SC_i[1], \ldots SC_i[n])$ is defined for the sensitive context of the developer, and similarly, $NSC_i=\max(NSC_i[0], NSC_i[1], \ldots SC_i[n])$ is defined for the insensitive context of the developer. Here, n is the number of layers of the developer image.

The final profile generator 170 generates the final profile that is applied to deploy containers by merging the host profile with the max configuration fetched from the developer profile.

The final profile applies the sensitive context to the host policy and extends the insensitive context to suit the needs of the developer.

The final profile is defined as $SC_f=\min(SC_h, SC_d)$ and $NSC_f=NSC_d$. Here, $SC_f$ and $NSC_f$ denote the sensitive context and the insensitive context for the final profile.

Figure 4:
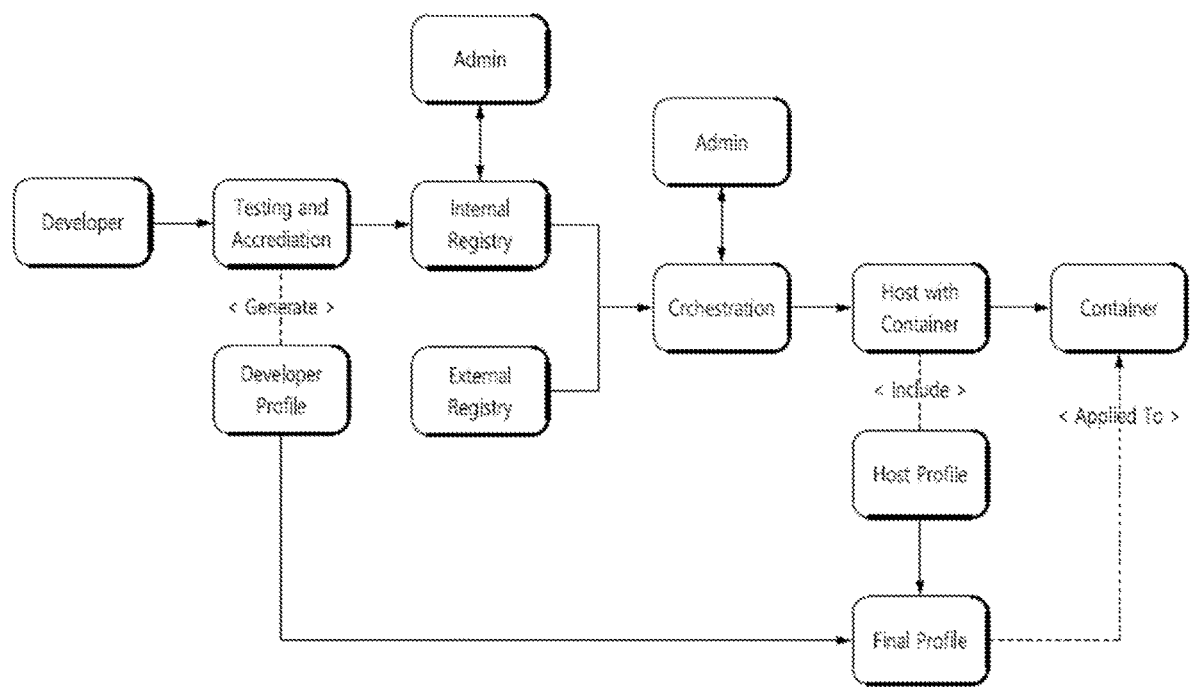
FIG. 4 is a diagram illustrating a container design according to the present invention.

Referring to FIG. 4, the final profile is generated according to the model of the present invention from the host profile provided from the host context extractor 130 and the developer profile provided from the max configuration extractor 150.

The generated final profile is applied to deploy the container to ensure proper isolation and security.

The docker or other containers are supposed to apply the context to the container. A trusted image developer may provide the profile for images, and the host may deploy containers and apply policies as follows.

The following is a command example. A "--security-opt" command sets security options, and the following "seccomp" allows to provide security by applying the profile.

[docker run-d--security-opt seccomp=< >]

The above describes how to actually apply the profile, but the host needs to know which parts are safe for its system. The host needs to know a type of service in the image (provided by a trusted developer), and may generate the final profile based on the known service type.

That is, for the sensitive context, the host removes all irrelevant options (to provide the least sensitive context). The host provides the insensitive context as much as possible to satisfy the request.

For example, when an image requires 300 MB memory but the host may provide only 200 MB memory, the host will provide 200 MB memory (the host's maximum). However, when the host may host more than 300 MB memory, the host deploys an image with 300 MB memory defined by the developer.

In the model proposed in the present invention, the developer and the host operate together to provide the secure and optimized environment. Specifically, the developer is responsible for analyzing the environment (white box analysis) to provide the profile. The developer's profile is merged with the host's profile to generate the final profile optimized by both the developer and the host.

When compared to the existing approach, the white box analysis from the developer's side is more accurate than the black box analysis from the host's side. Furthermore, the host may apply its own security and isolation policy to the developer profile to constrain the container by the security context since the host continues to hold its own profile.

Table 1 below shows the differences between the existing model and the model proposed in the present invention.

TABLE 1

| Comparison target | Existing model | Proposed model |
| --- | --- | --- |
| Analysis method | Black box analysis | White box analysis |
| Security responsibility | Host | Host and developer |
| Optimization method | Analysis optimization by host | Profile creation and analysis by developer and policy reinforcement by host |
| Security profiling (seccomp rules) | Same except for black box analysis | Definition by developer and limitation by host |
| Security risk | Provide unnecessary system call or apparatus | Provide only system call or apparatus declared by developer |
| Understanding of container | Provide OS and only basic manifest of architecture | Provide better understanding from developer profile |

As described above, the present invention may provide the optimized environment to the developer and the host by generating the final profile according to the hierarchical model using the host profile (deployment profile) and the developer profile. In addition, it is possible to perform more accurate analysis with the white box analysis from the developer's side compared to the existing black box analysis method.

Furthermore, the host may apply its own security and isolation policy to the developer profile to ensure that the container is constrained by the security context since the host continues to hold its own profile.

Figure 5:
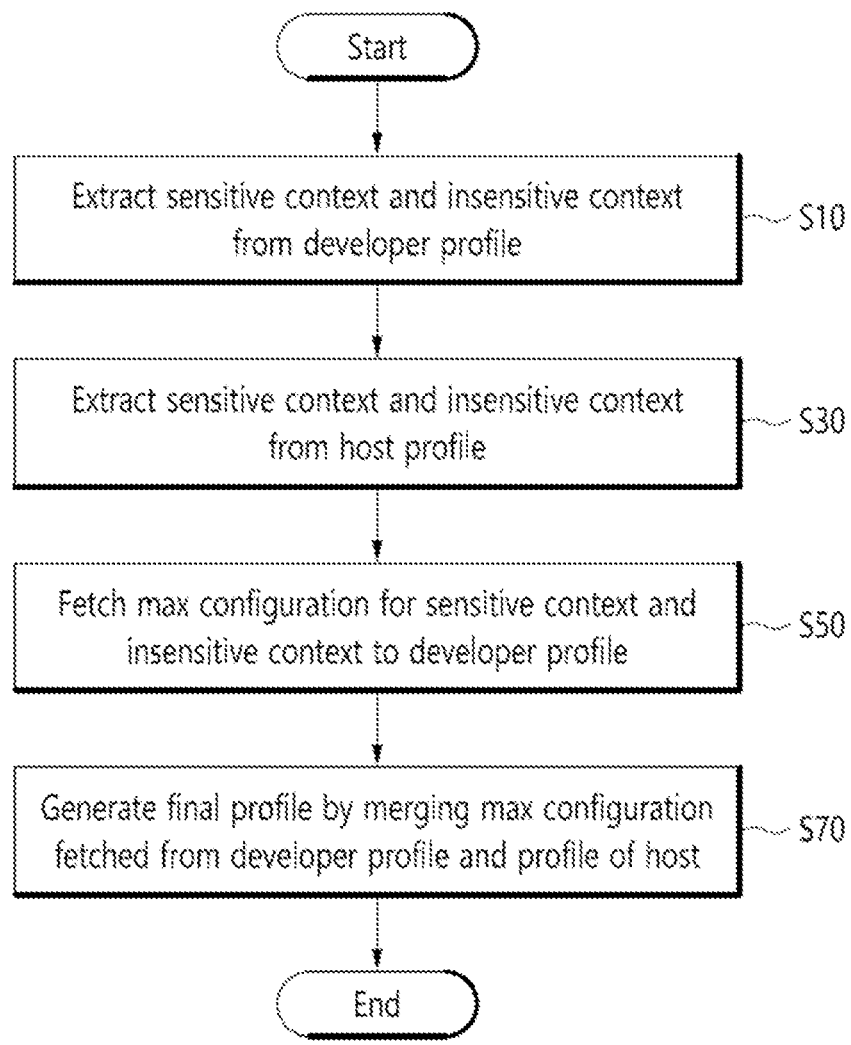
FIG. 5 is a flowchart of a design apparatus for sharing a profile in a container environment according to an embodiment of the present invention.

FIG. 5 is a flowchart of a design method for sharing a profile in a container environment according to an embodiment of the present invention.

The design method for sharing a profile in a container environment according to the present embodiment may proceed in substantially the same configuration as that of the apparatus 10 of FIG. 1. Accordingly, the same components as those of the apparatus 10 of FIG. 1 are denoted by the same reference numerals, and repeated description thereof will be omitted.

Also, the design method for sharing a profile in a container environment according to the present embodiment may be executed by software (an application) for performing a design for sharing a profile in a container environment.

According to the present invention, the final profile for providing the safe and optimized environment to the developer and the host is generated by using the context for the developer and the host, and the generated final profile is applied to the container.

Referring to FIG. 5, in the design method for sharing a profile in a container environment according to the present embodiment, the sensitive context and the insensitive context for the profile provided by the developer are first extracted (operation S10).

The developer (development) profile represents the recommended insensitive security and resource contexts. The development profile is provided by a container image provider.

For example, the sensitive context may be defined as the information related to the system-based access control or sandboxing policy, and the insensitive context may be defined as information unrelated to security.

However, the criteria for distinguishing between the sensitive context and the insensitive context may be defined differently depending on the system policy, the user needs, and etc., and may be modified and updated.

The sensitive context and the insensitive context for the profile provided by the host are extracted (operation S30).

The host (deployment) profile represents the security and resource contexts that the host may assign to a particular container. Similarly, the criteria for distinguishing between the sensitive context and the insensitive context may be defined differently depending on the system policy, the user needs, and etc., and may be modified and updated.

The max configurations for the sensitive context and the insensitive context are fetched from each image layer of the developer (operation S50).

Referring to FIG. 3, the structures of the development profile and the deployment profile are illustrated, and the container is formed of a collection of various image layers. In the profile sharing model, each layer has its own security and the resource profile.

The final profile, which is applied to deploy the container, is generated by merging the host profile with the max configuration fetched from the developer profile (operation S70). In this case, the model of FIG. 4 may be applied.

The final profile applies the sensitive context to the host policy and extends the insensitive context to suit the needs of the developer.

Accordingly, the sensitive context of the final profile may be the minimum profile of the sensitive context of the host and the sensitive context of the developer, and the insensitive context of the final profile may be the insensitive context of the developer.

For the sensitive context, the host removes all irrelevant options (to provide the least sensitive context). The host provides the insensitive context as much as possible to satisfy the request. For example, when an image requires 300 MB memory but the host may provide only 200 MB memory, the host will provide 200 MB memory (the host's maximum), but when the host may host more than 300 MB memory, the host deploys an image with 300 MB memory defined by the developer.

In the model proposed in the present invention, the developer and the host operate together to provide the secure and optimized environment. Specifically, the developer is responsible for analyzing the environment (white box analysis) to provide the profile. The developer's profile is merged with the host's profile to generate the final profile optimized by both the developer and the host.

When compared to the existing approach, the white box analysis on the developer side is more accurate than the black box analysis on the host. Furthermore, it is possible for the host to apply its own security and isolation policy to the developer profile to ensure that the container is constrained by security context since the host still has its own profile.

Such a design method for sharing a profile in a container environment may be implemented as an application or implemented in the form of program instructions that may be executed through various computer components, and thus may be recorded on a computer-readable recording medium. The computer-readable recording medium may include a program command, a data file, a data structure, or the like, alone or a combination thereof.

The program instructions recorded on the computer-readable recording medium may be specially designed and configured for the present invention or be known to those skilled in the field of computer software.

Examples of the computer-readable recording media may include a magnetic medium (such as a hard disk, a floppy disk, or a magnetic tape), an optical recording medium (such as a compact disk read only memory (CD-ROM) or a digital versatile disk (DVD)), a magneto-optical medium such as a floptical disk, and a hardware device specially configured to save and execute program commands, such as a read only memory (ROM), a random access memory (RAM), a flash memory, or the like.

Examples of the program instructions include a high-level language code capable of being executed by a computer using an interpreter, or the like, as well as a machine language code created by a compiler. The hardware device may be configured to be operated as one or more software modules to execute processing according to the present invention, and vice versa.

Although the embodiments of the present invention have been described hereinabove, those skilled in the art will be able to understand that the present invention may be variously modified and altered without departing from the principle and scope of the present invention disclosed in the following claims.

INDUSTRIAL APPLICABILITY

The present invention provides an optimal environment to a developer and a host by generating a final profile according to a hierarchical model using a host profile (distribution profile) and a developer profile. Accordingly, the present invention can be usefully as a docker manifest option optimization tool, etc.

EXPLANATION OF REFERENCE NUMERALS

10: design apparatus for sharing a profile in a container environment
110: developer context extractor
130: host context extractor
150: max configuration extractor
170: final profile generator
111: sensitive context extractor
113: insensitive context extractor

The invention claimed is:

1. A design method for sharing a profile in a container environment, the design method comprising:
    extracting a sensitive context and an insensitive context for a profile provided by a developer, wherein the sensitive context is defined as information related to a system-based access control or a sandboxing policy and the insensitive context is defined as information unrelated to security;
    extracting a sensitive context and an insensitive context for a profile provided by a host;
    fetching the sensitive contexts and the insensitive contexts from each image layer of the developer; and
    generating a final profile by merging the host profile with the fetched sensitive contexts and insensitive contexts, wherein the final profile is applied to deploy a container,
    wherein, in the generating of the final profile, a sensitive context is applied to a host policy, and an insensitive context is extended according to a request of the developer,
    wherein the sensitive context of the final profile is a minimum context among the sensitive context of the host profile and the sensitive context of the developer profile.

2. The design method of claim 1, wherein the insensitive context of the final profile is the insensitive context of the developer profile.

3. A non-transitory computer-readable storage medium on which a computer program for executing the design method for sharing a profile in a container environment of claim 1 is recorded.

4. A design apparatus for sharing a profile in a container environment, the design apparatus comprising:
   at least one hardware processor; and
   a non-transitory computer-readable storage medium storing instructions which, when executed by the at least one hardware processor, are configured to perform operations comprising:
     extracting a sensitive context and an insensitive context for a profile provided by a developer, wherein the sensitive context is defined as information related to a system-based access control or a sandboxing policy and the insensitive context is defined as information unrelated to security;
     extracting a sensitive context and an insensitive context for a profile provided by a host;
     fetching the sensitive contexts and the insensitive contexts from each image layer of the developer; and
     generating a final profile by merging the host profile with the fetched sensitive contexts and insensitive contexts, wherein the final profile is applied to deploy a container,
   wherein, in the generating of the final profile, a sensitive context is applied to a host policy, and an insensitive context is extended according to a request of the developer,
   wherein the sensitive context of the final profile is a minimum context among the sensitive context of the host profile and the sensitive context of the developer profile.

5. The design apparatus of claim 4, wherein the insensitive context of the final profile is the insensitive context of the developer profile.

\* \* \* \* \*